United States Patent [19]

Kabacoff

[11] Patent Number: 4,937,833
[45] Date of Patent: Jun. 26, 1990

[54] ANALOG FREQUENCY MODULATED LASER USING MAGNETOSTRICTION

[75] Inventor: Lawrence T. Kabacoff, Columbia, Md.

[73] Assignee: The United States of America as represented by the Secretary of the Navy, Washington, D.C.

[21] Appl. No.: 436,935

[22] Filed: Nov. 13, 1989

Related U.S. Application Data

[63] Continuation of Ser. No. 715,786, Mar. 25, 1985, abandoned.

[51] Int. Cl.$^5$ .............................................. H01S 3/10
[52] U.S. Cl. ......................................... 372/28; 372/37; 372/39; 372/66; 372/6; 350/96.29
[58] Field of Search .................. 372/7, 28, 26, 6, 66, 372/61, 32, 39, 40; 455/610, 612; 350/96.29

[56] References Cited

U.S. PATENT DOCUMENTS

| | | | |
|---|---|---|---|
| 3,166,673 | 1/1965 | Vickery et al. | 372/28 |
| 3,170,122 | 2/1965 | Bennett, Jr. | 372/32 |
| 3,354,407 | 11/1967 | Howling | 372/37 |
| 3,355,674 | 11/1967 | Hardy | 372/6 |
| 3,614,655 | 10/1971 | Bolger | 331/94.5 |
| 3,635,562 | 1/1972 | Catherin | 356/112 |
| 3,644,042 | 2/1972 | Kolb, Jr. et al. | 356/5 |
| 3,684,980 | 8/1972 | Kay | 378/66 |
| 3,855,544 | 12/1974 | Bowness | 331/94.5 |
| 4,079,339 | 3/1978 | Kobayashi et al. | 331/94.5 |
| 4,119,930 | 10/1978 | Abrams et al. | 332/7.51 |
| 4,128,299 | 12/1978 | Maher | 350/96.13 |
| 4,236,243 | 11/1980 | Davies et al. | 370/3 |
| 4,243,320 | 1/1981 | Gordon | 356/73.1 |
| 4,376,248 | 3/1983 | Schmadel et al. | 350/96.29 |
| 4,378,497 | 3/1983 | Giallorenzi | 250/227 |
| 4,433,291 | 2/1984 | Yariv et al. | 350/96.29 |
| 4,452,533 | 6/1984 | Miles et al. | 356/352 |

OTHER PUBLICATIONS

Yariv et al., "Proposal for Detection of Magnetic Fields through Magnetostrictive Perturbation of Optical Fibers", Opt. Lett. vol. 5, No. 3, Mar. 1980.

*Primary Examiner*—Léon Scott, Jr.
*Attorney, Agent, or Firm*—Kenneth E. Walden; Jacob Shuster

[57] ABSTRACT

The present invention relates to an analog frequency modulatable laser. The radiation of the lasing medium is analog frequency modulated by change of the optical path length by movement of reflective mirrors forming the resonant cavity at the frequency of radiation of the laser in a manner corresponding to an information signal. In one embodiment, a magnetostrictive material is deposited on and bonded to the outer periphery of an active lasing medium having appropriate mirrors on the ends thereof. The magnetostrictive material is exposed to an information encoded magnetic field and physically expands or contracts the physical length of the lasing medium along the optical axis of the lasing medium corresponding to the modulated information of the magnetic field. In another embodiment an optical fiber is secured by cementing or clamping to a transparent end of the active lasing material and one of the optical cavity reflecting mirrors is disposed on the outside end of the optical fiber with the magnetostrictive material being disposed on the optical fiber.

15 Claims, 1 Drawing Sheet

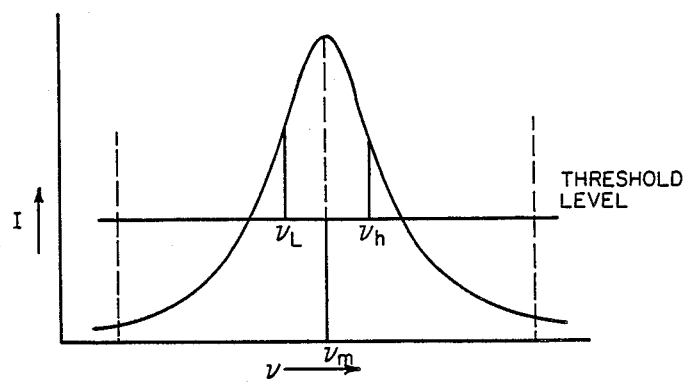
FIG. 1
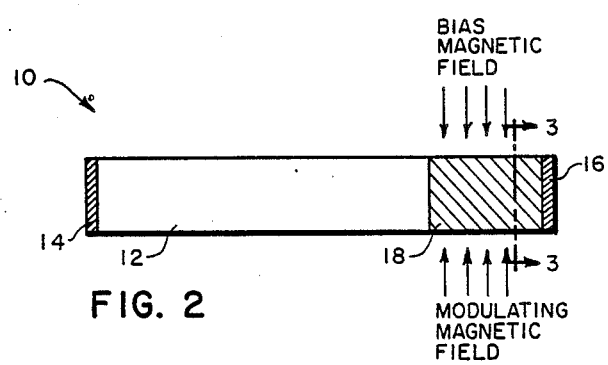 
FIG. 2 · FIG. 3
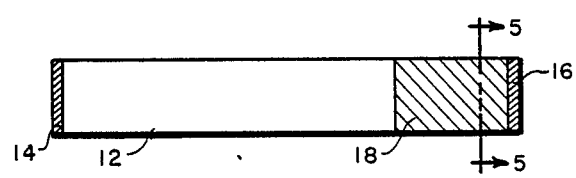 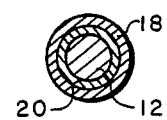
FIG. 4 · FIG. 5
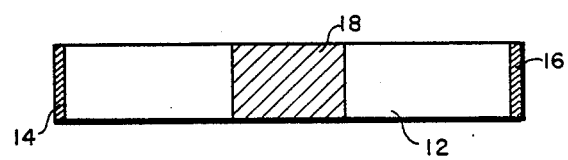
FIG. 6
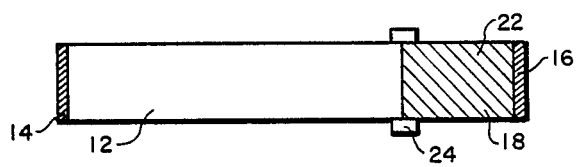
FIG. 7
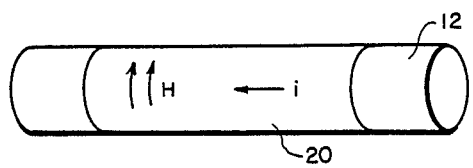
FIG. 8

4,937,833

ANALOG FREQUENCY MODULATED LASER USING MAGNETOSTRICTION

This application is a continuation of application Ser. No. 715,786, filed Mar. 25, 1985 now abandoned.

BACKGROUND OF THE INVENTION

The present invention relates to optical modulation and, more particularly, to the analog frequency modulation of an optical laser.

A great amount of research and development effort is being expended to develop high speed information lasers and optical fibers. The vast amount of this research effort is centered about digital modulation in the gigahertz range using optical fibers for transmitting the maximum distance without repeaters. The bulk of this digital transmission uses pulse code modulation (PCM). Much of the research effort is directed to modulators for PCM which involve the ability to switch transmitted light on and off at the high switching rates necessary. The maximum distance of transmission capability for digital modulation is limited by the ability of the detector to detect the presence and position of different pulses which have undergone smearing or dispersion during transmission through the fiber. Circuitry for accomplishing the modulation and detection of digital and analog modes are expensive and bulky, the modulators requiring the use of special crystals.

The motivation for the extensive development of the ability to modulate light for information transmission is due to the much higher carrier frequency of the light than radio or microwaves, and therefore light can be used to transmit information at much higher rates than these more conventional methods.

In this recent research and development work, modulation of light sources using standard analog modulation has been largely overlooked with the idea that digital transmission is noise immune and has greater reliability. However, the digital approach greatly increases complexity and cost of modulating and demodulating a light source.

Accordingly, it is desirable to provide a modulation of a light transmission system for transmission of information which is inexpensive, very compact, and is capable of the high bandwidths of miniature systems, e.g., greater than 1000 MHz.

Accordingly, it is an object of the present invention to provide an analog frequency modulatable laser for information modulation of a coherent light source at large bandwidths.

Another object of the present invention is to provide an analog frequency modulator laser wherein the radiation frequency of the laser is frequency modulated by change of the optical resonant cavity forming mirrors corresponding to encoded information.

Yet another object of the present invention is to provide an analog frequency modulated laser frequency of radiation of the laser is modulated by magnetostrictive means moving an optical cavity determining mirror.

Further objects and advantages of the presnt invention will become apparent as the following description proceeds and features of novelty characterizing the invention will be pointed out with particularity and to claims annex to and forming a part of this specification.

SUMMARY OF THE INVENTION

Briefly, the present invention relates to an analog frequency modulatable laser. The radiation from the lasing medium is analog frequency modulated by change of the optical path length by movement of reflective mirrors forming the resonant cavity at the frequency of radiation of the laser in a manner corresponding to an information signal. In one embodiment, a magnetostrictive material is deposited on and bonded to the outer periphery of a active lasing medium having appropriate mirrors on the ends thereof. The magnetostrictive sleeve is exposed to an information encoded magnetic field and physically expands or contracts the lasing medium along the optical axis of the lasing medium corresponding to the modulated information of the magnetic field.

In another embodiment, an optical fiber is securely cemented or clamped to a transparent end of the active lasing material and one of the optical cavity reflecting mirrors is disposed on the outside end of the optical fiber. In this embodiment, the magnetostrictive member is disposed on the optical fiber and causes expansion or contraction of the fiber for moving the mirror and increasing and decreasing the optical path length of the cavity corresponding to the information encoded on a magnetic field. In each of these two embodiments, the magnetic field can be provided by an external magnetic field source such as a coil, or by a highly conductive electrically conductive plating deposited beneath the magnetostrictive sleeve, onto the active lasing medium or the optical fiber, as the case may be.

DESCRIPTION OF THE DRAWINGS

For a better understanding of the present invention reference may be had to the accompaning drawings wherein:

FIG. 1 is a graphic representation on an enlarged scale, of one band of a possible plurality of bands of lasing frequencies of a representative active lasing medium versus intensity of output.

FIG. 2 is a representation of one embodiment of the present invention.

FIG. 3 is a cross sectional view taken along lines 3—3 of FIG. 2.

FIG. 4 is a representation of another embodiment of the present invention.

FIG. 5 is a cross sectional view taken along line 5—5 of FIG. 4.

FIG. 6 is a variation of the of the embodiment of FIG. 1.

FIG. 7 is a representation of another embodiment of the laser of FIGS. 2 and 4 wherein the modulating means is deposited on an optical fiber secured to a transparent end of the lasing medium.

FIG. 8 shows the electromagnetic vectors of the electrically conducting layer of FIG. 5.

DETAILED DESCRIPTION OF THE PREFERRED EMBODIMENT

A medium suitable for stimulated emission of radiation has at least two electron energy levels, typically three levels, and sometimes four levels. In an unexcited atom, the electrons are typically at the lowest energy states. However, for lasing or stimulated emission to be accomplished, it is necessary that there be a population inversion, i.e., that there would be a greater electron population at a higher energy level than at a lower energy level. The population inversion should be retained at the higher level for a sufficient period of time for lasing to be accomplished. The population of electrons at the higher level may be obtained by excitation of the electrons. Ways of accomplishing such higher energy electron states are by means of incident radiation (light or radio frequency), especially for a solid rod, or in the case of a gaseous medium, by means of a gas discharge. This is often termed "pumping".

Stimulated emission of radiation denotes the electron transition from a higher energy level to a lower energy level with radiation thus emitted under the action of radiation (stimulating radiation) having a wavelength corresponding to the energy difference between the levels. In contrast, spontaneous emission denotes an electron transition with radiation being emitted without the action of stimulating radiation. The radiation obtained by stimulated emission is in cophase and correlative to the stimulating radiation which is thus amplified so that a coherent radiation is obtained. By causing the stimulating radiation to cover a long distance through the lasing medium by means of two reflecting members disposed at the ends along the length of the medium, for example formed by flat or curved mirrors with the radiation thus reciprocating through the medium between said reflecting members, stimulated emitted radiation is constantly added to the external stimulating energy while constant radiation can emerge via one of the a reflecting members which is partially transparent. An optical laser for the purposes of this discussion denotes stimulated emission radiation which is obtained of a wave length which lies in the range of the visible light spectrum or in adjacent ranges, for example of infared radiation or ultraviolet radiation.

For any lasing medium, there are a plurality of modes or bands of wave lengths which can be emitted by the medium by stimulated emission. Often there are different possible lasing levels within a material and the particular peak lasing wavelength chosen is accomplished by the tuning or forming a resonant cavity by the reflecting members as well as chosing the pumping energy, i.e., the spectral energy of the pumping optical source approximately coincides with the energy necessary to excite an electron to the higher level. Even within a particular chosen band, there is a bandwidth of emission wavelengths even though a laser, generally considered to be monochromatic, is not exactly monochromatic. That is to say that there is a bandwidth of emitted radiation, albeit narrow in comparison to other light sources. This narrow bandwidth of radiation is due in part to the statistical probabilities of the electron energy levels of the atom at the quantum level. At any event, the intensity verses frequency distribution for a particular chosen radiation comprises a curve typically following a Lorentzian distribution as shown in FIG. 1. As shown in FIG. 1, for a particular mode or transition state, any of the frequencies above the threshold level can be emitted by the laser. Typically, but not necessarily, the center frequency $\nu_m$ is chosen for maximizing the radiation emission at the peak of the Lorentzian function above the threshold level. This choosing of frequency is accomplished by selection of the mirror placement forming a resonant cavity at the frequency $\nu_m$. However, any of the other frequencies above the threshold level can be selected for emission generation, and in fact, they compete with the center frequency for exitation and do emit radiation thus forming the radiation bandwidth although relatively narrow by other standards. Accordingly, referring to FIG. 1, the resonant cavity formed by the mirrors can be chosen to select as a peak frequency other frequencies within the bandwidth although possibly at a lower intensity of emission frequencies close to $\nu_m$ but within the emission envelope, e.g., at the lower frequency end $\nu_L$ or at the higher frequency end $\nu_h$. These alternate frequencies can be selected, for a particular threshold level and excitation, by changing the resonance of the optical cavity formed by the reflective end mirrors. The resonance of the resonant cavity formed by the end mirrors is determined by the distances between the mirrors which are many multiple wave lengths of a particular chosen emission frequency. By microscopic changing of the distance between the mirrors thus changing the resonance of the resonant cavity to another frequency within the bandwidth, the peak emission of the laser can be changed to the new peak frequency. In this manner, the frequency of the laser is changable between a set of chosen frequencies, $\nu_L$ and $\nu_H$ corresponding to an encoded signal, and frequency modulation of the laser can be accomplished. It is the movement of the reflecting mirrors in a manner corresponding with information encoded signals for frequency modulating the laser emission to which this invention is directed.

Referring now to the other drawings wherein like reference numerals have been applied to like members, there is shown in FIG. 2 a representative drawing of a laser, generally designated 10. The laser 10 comprises an active lasing medium 12 and a pair reflecting end members or mirrors 14, 16. As is typical for laser constructions, one of the mirrors 14, 16 is made totaly reflecting and the other of the mirrors is made partially transmissive to facilitate extracting a portion of the reflected radiation from the laser. The generated radiation reciprocates between the reflecting members 14, 16.

Active medium 12 can be, for example, a rod shaped ruby. If the active medium 12 is such a solid substance and it is provided with substantially parallel end faces, the mirrors 14, 16 can be formed on the ends of the ruby. As an alternative, active medium 12 can be a discharge tube containing an active laser medium such as, helium-neon, or the like; or an eximer-dye laser can be used, in which case a large number of optical wavelengths can be chosen. In either case, pump energy may be supplied to the medium for example by incident radiation in which case the walls of the medium must be transparent, particularly for a solid rod or, in the case of a gaseous medium, excitation can be supplied by electrical discharge into the medium in which case suitable electrodes (not shown) are provided. The sources of the pump energy are not essential to this invention and are not shown in the figures. Other commonly employed lasers, as an example and not by limitation, which can be used are Neodynium: Yttrium Aluminum Garnet (YAG) or a $CO_2$ laser. The optical wave length of a carbon dioxide laser is in the region of 10.6 microns in the infrared and is commonly employed in modern optical communications systems. It is to be understood that the choice of such operating lasers is merely exemplary and that other lasers can be used with suitable modifications to the components of the embodiments to be described.

One of the mirrors 14, 16 is partially transmissive and the degree of transmission must be less than that necessary to maintain the threshold level for the off peak frequency to which the frequency modulation will move the peak laser radiating frequency, otherwise there is a risk of extinction of the lasing medium.

Referring again to FIG. 2 and to FIG. 3, a magnetostrictive film 18 is deposited directly onto the active laser medium 12 or the confining walls thereof in the case of a gaseous medium. For the exemplary embodiments herein disclosed, the magnetostrictive film 18 is deposited by magnetron sputtering which achieves excellent bonding to the substrate medium walls for purposes which will be described hereinafter. The material of film 18 can typically be an amorphous ferromagnetic magnetic material or a metallic glass such as METGLAS TM 2605 $S_2$ or 2605 SC. For the particular material chosen, the magnetostriction effect should be along the optical axis of the laser, i.e., along the elongated length of medium 12, along the optical axis defined by mirrors 14, 16. The speed with which these materials respond to an applied magnetic field is very fast and is limited for practical purposes only to the skin depth. This means, that in general, a varying magnetic field will be attenuated by a conducting material so that only regions near the surface will experience an appreciable field. This skin depth is inversely proportional to the square root of the product of the conductivity and of the film 18 permeability, and the frequency of the applied field. In the exemplary embodiment, modulation of the carrier frequency exactly tracks modulation of the applied field. The skin depth of a typical metallic glass suitable for such purposes is 1 $\mu$m at 80 MHz and 0.5 $\mu$m at 320 Mhz.

In the exemplary embodiment, magnetron sputtering is used for achieving a high bonding strength between the film 18 and the active medium 12. The magnetron sputting is accomplished in an inert gas atmosphere, e.g., argon, at reduced pressure, in a manner known in the art. The magnetostrictive area is shown in cross section in FIG. 3. The magnetic domains of the magnetostrictive material, as previously stated should be oriented such that the magnetostrictive effect is along the optical axis between mirrors 14 and 16. Upon application of a magnetic field, the magnetostrictive effect will cause the optical path length between mirrors 14 and 16 to either increase or decrease by physically stretching or compressing medium 12 a sufficient amount for changing the resonance of the cavity and peak emissions frequency as shown on FIG. 1. The bias magnetic field as shown in FIG. 2 can be applied to the magnetostrictive material 18 and a modulating field can then be applied for the analog frequency modulation of the laser material 12. This applied magnetic field can be from a solenoid coil wound about the magnetostrictive film 18.

Magnetostrictive metallic glasses have some unique proporties which make them highly suited for this application. As amorphus materials they have high intrinsic resistivity and enhanced skin depth. They have good saturation magnetostriction (typically 30 parts per million), and they require very low magnetic fields to sustantially alter the length. Typically a DC bias field of a few Oersteads is sufficient, with a modulating field of only a few milliOersteads.

Referring now to FIG. 6 the magnetostrictive material 18 is disposed at a point other than at an end of active medium 12. Magnetostrictor 18 can be placed anywhere along the axial length as increasing the axial length of the active material 12 anywhere along the axis is sufficient to increase optical path lengths between end mirrors 14, 16. In cases where optical pumping is required, pumping occurs through the non-coated portions of medium 12.

Referring now to FIGS. 4 and 5 there is shown an alternate embodiment of the present invention. On a portion of the active medium 12 is deposited, by magnetron sputtering, an electrically conducting layer 20 and the magnetostrictive material 18 is deposited on top of conducting layer 20. It is desirable that layer 20 be made of a highly electrically conducting material, and in the exemplary embodiment, aluminum is used. Electrical terminals (not shown) permit application of a electrical current having encoded information being passed through conducting layer 20. The electrical current through conducting layer 20 generates a magnetic field (shown in FIG. 8), which interacts with magnetostrictive material 18 which in turn changes length as discussed above.

Referring now to FIG. 7 there is shown another embodiment of the present invention. Active medium 12 is connected at one end to a non-active portion or optical fiber segment 22 and mirrors 14 and 16 are disposed at the ends of the unitary body. Portion 22 at a first end can an optical fiber or other non lasing material which is transparent at the lasing wavelength. Optical portion 22 is fastened to a first transparent end of lasing medium 12 by cementing or clamping as shown by clamp 24. The interface between medium 12 and portion 22 can be optically flat, in abutting relationship, or can be space apart, or can be filled with a refractive index matching medium (not shown), as the case may be. In any event, stimulated emission radiation should freely traverse between both bodies of the active medium 12 and non-active medium 22 forming optical fiber segments along the optical axis between mirrors 14, and 16 as shown in FIG. 7. As shown above in connection with FIGS. 2 and 4 and the respective cross sectional views in FIGS. 3 and 5, magnetostrictive material 18 can be deposited on optical fiber 22 with the applied bias magnetic field and modulating magnetic fields being applied as shown in FIG. 2, or the electrically conducting layer 20 can be deposited beneath magnetostrictive material 18 as shown in FIG. 5. In either case, the operation of the laser 10 of FIG. 7 is similar to that of embodiments shown in FIGS. 2 and 4 in that the modulating magnetic field, however generated, interacts with a magnetostrictive material 18 and causes a change in the optical path length between mirrors 14, 16.

The bias magnetic field can be used to set a bias shrinkage or elongation depending upon the material 18 used from which the modulation can be achieved. For example, some magnetostrictive material reduce dimension when exposed to a magnetic field and some increase dimension. However, in the exemplary embodiment, positive magnetostriction material is used as it has been found to be more sensitive. The modulating field then varies the magnetic field plus and minus about the bias point. For the embodiment using electrically conducting layer 20, a DC bias current can be used for generating the bias magnetic field and a modulated alternating current to generate the modulating magnetic field. Similarly, the bias and modulating magnetic fields can be generated by a single solenoid coil instead of a pair of solenoid coils or a pair of conducting layers 20, one for each field.

The modulation of the optical path length is by physically stretching the material 12 or 22 upon which the magnetostrictive material is deposited along the optical axis. There may be some incidental squeezing effect with said sqeezing causing an elongation of the substrate or lasing material but in the exemplary embodiment, the stretching magnetostriction is the primary modulation mode.

Shown in FIG. 8, is the magnetic field generation by conducting layer 20. The current (i) is applied longitudinally along the optical axis and the magnetic field (H) is generated according to the right hand rule.

Thus there is shown an analog frequency modulanced laser wherein the optical path length is changed corresponding to an encoded magnetic signal applied to a magnetostrictive responsive portion. The carrier frequency is changed above and below within the stimulated emission radiation spectrum of the active medium for frequency modulating the emission radiation of the active medium in an analog frequency modulation manner for transmission of information.

It will be appreciated that numereous changes and are likely to occur to those skilled in the art and it is intended in the appended claims to cover all those changes and modifications which fall within the true spirit and scope of the present invention.

What is claimed as new and desired to be secured by letters patent is:

1. An analog frequency modulatable laser comprising:
   an active lasable medium in which stimulated emission of electromagnetic radiation is producable,
   a first and second radiation reflecting means spaced apart a predetermined distance and operatively connected with said active medium defining an optical axis therebetween for causing generated stimulated emission radiation to traverse the medium by multiple reflections between the reflecting means in directions substantially parallel to said optical axis and forming a resonant cavity at a resonant frequency of radiation within the stimulated emission radiation spectrum of the active medium,
   a portion of said reflected radiation being extracted from the active medium, and
   magnetostrictive responsive means disposed about and bonded to portion of the outer periphery of the medium for changing the optical path length between the first and second radiation reflecting means, for changing the resonance of the cavity, and for changing of the frequency of the reflected radiation in response to a magnetic field applied to the magnetostrictive responsive means.

2. The laser of claim 1 further comprising an electrical conducting layer disposed between the outer periphery of the medium and the magnetostrictive responsive means, said layer being energizable by an information encoded electric current flow of sufficient intensity for generating a corresponding magnetic field of sufficient intensity to effect the magnetostrictive responsive means.

3. The laser of claim 2 wherein the lasable medium includes an optical fiber portion, one of said reflecting means is mechnically coupled to the optical fiber portion, and the magnetostrictive responsive means and the electrically conducting layer are disposed about and respectively bonded to the outer periphery of the optical fiber portion.

4. The laser of claim 1 wherein one of the reflecting means is partially transmissive to facilitate the extraction of said portion of the reflected radiation therethrough from the active medium.

5. An analog frequency modulatable laser comprising: a lasable medium having an active portion in which stimulated emission of electromagnetic radiation is producible and an optical fiber portion disposed along the length of the active medium portion, a first and second radiation reflecting means spaced apart at a predetermined distance and operatively connected with said active medium portion and optical fiber portion defining an optical axis therebetween for causing generated stimulated emission radiation to traverse the active medium portion and the fiber portion by multiple reflections between the reflecting means substantially parallel to said optical axis and forming a resonant cavity at a frequency of radiation within the stimulated emission radiation spectrum of the active medium portion, one of said radiation reflecting means being mechanically coupled to the optical fiber portion, a portion of said reflected radiation being extracted from the medium, and magnetostrictive response means disposed about and bonded to the outer periphery of the optical fiber portion for changing the optical path length between the first and second radiation reflecting means, for changing the resonance of the cavity, and for changing of the frequency of the reflected radiation in response to a magnetic field applied to the magnetostrictive responsive means.

6. The laser of claim 5 wherein the active lasable medium portion and the optical fiber portion are unitary with each other.

7. The laser of claim 6 further comprising an electrical conducting layer disposed between the outer periphery of the optical fiber portion and the magnetostrictive responsive means, said layer being energizable by an information encoded electric current flow of sufficient intensity for generating a corresponding information encoded magnetic field of sufficient intensity to effect the magnetostrictive responsive means.

8. An analog frequency modulatable laser comprising:
   a laser comprising a lasable medium having an active portion in which stimulated emission of electromagnetic radiation is producable and an optical fiber portion unitary therewith,
   a first and second radiation reflecting means spaced apart at a predetermined distance and operatively connected with said active medium portion and optical fiber portion defining an optical axis therebetween for causing generated stimulated emission radiation to traverse the medium and the optical fiber portion by multiple reflections between the reflecting means substantially parallel to said optical axis and forming a resonant cavity at a frequency of radiation within the stimulated emission radiation spectrum of the active medium portion, one of said radiation reflecting means being mechanically coupled to the optical fiber portion,
   a portion of said reflected radiation being extracted from the active medium,
   an electrical conducting layer disposed about and bonded to the outer periphery of the optical fiber portion, said layer being energizable by an information encoded electric current of sufficient intensity for generating a corresponding information encoded magnetic field, and
   magnetostrictive responsive means disposed about and bonded to the outer periphery of the electrical conducting layer, said responsive means being effectable by the magnetic field generated by the electrical conducting layer for changing the optical path length between the first and second radiation reflecting means, for changing the resonance of the cavity, and for analog changing of the frequency of the reflected radiation in response to the applied magnetic field generated by the electrical conducting layer.

9. An analog frequency modulated laser comprising:
an active lasable medium in which stimulated emission of electromagnetic radiation is producable,
a first and second radiation reflecting means spaced apart at a predetermined distance and operatively connected with said active medium defining an optical axis therebetween for causing generated stimulated emission radiation to traverse the medium by multiple reflections between the reflecting means substantially parallel to said optical axis and forming a resonant cavity at a frequency of radiation within the stimulated emission radiation spectrum of the active medium, one of said radiation reflecting means being mechanically coupled to the medium,
a portion of said reflected radiation being extracted from the active medium,
an electrical conducting layer disposed about and bonded to the outer periphery of the medium, said layer being energizable by an information encoded electric current of sufficient intensity for generating a corresponding information encoded magnetic field, and
magnetostrictive responsive means disposed about and bonded to the outer periphery of the electrical conducting layer, said responsive means being effectable by the magnetic field generated by the electrical conducting layer for changing the optical path length between the first and second radiation reflecting means, for changing the resonance of the cavity, for analog changing of the frequency of the reflected radiation in response to the applied magnetic field generated by the electrical conducting layer.

10. A high sensitivity optical device through which an optical path extends, comprising at least two optical fiber segments, each segment having a first and second end; a coating surrounding the two fiber segments with the first end of each segment aligned and physically held in position with respect to the first end of the other segment; reflecting means adjacent to the second end of each of the fiber segments for creating the optical path in said device having the two optical fiber segments; and means for stretching said coating thereby causing a variation in the length of the optical path in said device.

11. The device as in claim 10 wherein said means for stretching includes an additional coating of amorphous metallic, magnetic material applied to said fiber segments.

12. The device as in claim 10 wherein said reflecting means comprises mirrors aligned against the second end of each of the fiber segments.

13. The device as in claim 10 wherein said coating is made of electrically conductive material to which electrical current is applied to generate a magnetic field.

14. The device as in claim 13 wherein said means for stretching comprises an additional coating of magnetostrictive material interacting with said magnetic field.

15. The device as in claim 14 wherein said additional coating overlies the first mentioned coating through which the additional coating acts on the fiber segments to cause said variation in length of the optical path.

* * * * *